United States Patent [19]

Kawaguchi et al.

[11] Patent Number: 5,328,204
[45] Date of Patent: Jul. 12, 1994

[54] ACCELERATION SENSOR

[75] Inventors: Teruhiko Kawaguchi; Teruhiko Koide, both of Aichi, Japan

[73] Assignee: Kabushiki Kaisha Tokai-Rika-Denki Seisakusho, Aichi, Japan

[21] Appl. No.: 62,566

[22] Filed: May 18, 1993

[30] Foreign Application Priority Data

May 19, 1992 [JP] Japan .................. 4-32956[U]
Oct. 12, 1992 [JP] Japan .................. 4-70947[U]

[51] Int. Cl.$^5$ ............................................. B60R 21/32
[52] U.S. Cl. .............................. 280/734; 200/61.45 R;
200/61.48
[58] Field of Search ............... 280/734, 806; 180/282;
200/61.45, 61.48, 61.49, 61.53; 73/514;
102/252, 253, 272, 274

[56] References Cited

U.S. PATENT DOCUMENTS

| 3,407,667 | 10/1968 | Doeringsfeld | 200/61.45 R |
| 4,287,398 | 9/1981 | Ziv et al. | 200/61.45 R |
| 5,024,157 | 6/1991 | Nishikawa | 180/282 |
| 5,069,479 | 12/1991 | Koide et al. | 280/734 |
| 5,080,394 | 1/1992 | Mori et al. | 280/734 |

FOREIGN PATENT DOCUMENTS

| 1-274069 | 11/1989 | Japan . |
| 2-124749 | 10/1990 | Japan . |
| 2-125862 | 10/1990 | Japan . |
| 2-125866 | 10/1990 | Japan . |
| 2-249744 | 10/1990 | Japan . |

Primary Examiner—Margaret A. Focarino
Assistant Examiner—Christopher P. Ellis
Attorney, Agent, or Firm—Fisher & Associates

[57] ABSTRACT

An acceleration sensor. An inertial mass moves inertially when a vehicle suddenly accelerates. A longitudinal direction portion of a trigger lever abuts a portion of a peripheral surface of the inertial mass at a side in a direction of inertial movement thereof. The trigger lever is pushed by the peripheral surface due to inertial movement of the inertial mass, and is rotated around a fulcrum from a first position to a second position. The trigger lever is provided with a trigger means which is located at a position separated by a predetermined distance from the fulcrum and at a position which is different from a position at which the trigger lever abuts the inertial mass. An ignition pin is movable from a non-actuating position at which an occupant protection device is not actuated to an actuating position at which the ignition pin actuates the occupant protection device. The ignition pin has an engaging member. When the trigger lever is at the first position, the engaging member engages with the trigger means so as to position the ignition pin at the non-actuating position. When the trigger lever is moved to the second position, the engaging member cancels engagement of the trigger means and the engaging member so that the ignition pin is movable to the actuating position. An urging means usually urges the ignition pin toward the actuating position.

19 Claims, 5 Drawing Sheets

ACCELERATION SENSOR

BACKGROUND OF THE INVENTION

1. Field of the Invention

The present invention relates to an acceleration sensor in which an actuating member is moved from a non-actuating position to an actuating position, at which the actuating member actuates an occupant protecting device, by inertial movement of an inertial mass which is caused by application of acceleration to the inertial mass when a vehicle suddenly decelerates.

2. Description of the Related Art

An air bag device is known as a device for protecting an occupant of a vehicle.

In an air bag device, when a vehicle suddenly decelerates, an air bag inflates so that an occupant is protected. An acceleration sensor is used to actuate the air bag device when the vehicle suddenly decelerates.

As illustrated in FIG. 5, conventionally, a ball 80 is used as an inertial mass. The ball 80 is provided so as to be able to move inertially when a vehicle suddenly decelerates. When the ball 80 moves inertially, an end portion of the lever 82 ( i.e., the left end portion as illustrated in FIG. 5 ) is pushed toward the front of the vehicle (i.e., in the direction of the FR arrow) by the ball 80. (Hereinafter, the front of the vehicle will be denoted by the FR arrow). The lever 82 rotates around a rotation shaft 84, which is formed so as to project at both end surfaces in the longitudinal direction (i.e., the direction orthogonal to the surface of the paper in FIG. 5) of a trigger member 100 which is provided at a longitudinally intermediate portion of the lever 82.

An ignition pin 86 serving as an actuating member is provided at the longitudinally intermediate portion of the lever 82. The ignition pin 86 is movable, in a direction parallel to the direction of inertial movement of the ball 80, from a non-actuating position, at which an unillustrated detonator is not actuated, to an actuating position, at which the ignition pin 86 ignites the detonator. A bias pin 102, which is urged toward the front of the vehicle by a bias spring 92, abuts the other end portion of the lever 82 (i.e., the right end portion as illustrated in FIG. 5). The bias spring 92 exhibits resistance against inertial movement of the ball 80 caused by deceleration, vibration and the like which are generated under normal running conditions of the vehicle. Therefore, inertial movement of the ball 80 is prevented. Accordingly, the engaging of a trigger portion 90 and an engaging collar 88 of the ignition pin 86 is not canceled, and the ignition pin 86 is not inadvertently moved.

Normally, the engaging collar 88 provided at the longitudinally intermediate portion of the ignition pin 86 is engaged with the trigger portion 90, and the ignition pin 86 is maintained at the non-actuating position, at which the detonator is not actuated. However, when the vehicle suddenly decelerates, the lever 82 is rotated by the inertial movement of the ball 80 towards the front of the vehicle against the urging force of the bias spring 92, and the engagement of the trigger portion 90 and the engaging collar 88 is canceled. Due to this cancellation, the ignition pin 86 is moved by the urging force of an ignition spring 94 toward the actuating position at which the detonator is actuated. The ignition pin 86 abuts the detonator, and the detonator ignites. Due to the ignition of the detonator, a gas-generating material combusts, and gas is generated. The generated gas is supplied to the interior of the air bag, and the air bag inflates.

However, in the above-described conventional acceleration sensor, the bias spring 92 is provided separately from the ignition spring 94 which applies the force for ignition by urging the ignition pin 86 to move to the actuating position. This results in an increased number of structural parts and in troublesome assembly.

Further, in this conventional acceleration sensor, the trigger member 100, at which the trigger portion 90 is formed, is manufactured from a cylindrical member 150 by a number of processes, as can be seen from FIG. 6. Namely, both axial direction end portions of the cylindrical member 150 are cut (i.e., the rotation shaft 84 is formed), a longitudinally intermediate portion of the cylindrical member 150 is cut in order to form the trigger portion 90, a lever insertion hole 102, in which the lever 82 is inserted, is formed, and the like. Further, there is work involved in inserting the lever 82 in the lever insertion hole 102 and work involved in other processes as well. The processing of the trigger member 100 and the number of stages involved in assembly lead to an increase in the manufacturing cost of the conventional acceleration sensor.

SUMMARY OF THE INVENTION

With the aforementioned in view, an object of the present invention is to provide an acceleration sensor in which the number of structural parts, the number of assembly processes, and the cost can be reduced.

The acceleration sensor of the present invention includes an inertial mass which moves inertially when a vehicle suddenly decelerates; a trigger lever, a longitudinal direction portion of the trigger lever abutting a portion of a peripheral surface of the inertial mass at a side in a direction of inertial movement of the inertial mass, the trigger lever being pushed by the peripheral surface due to inertial movement of the inertial mass so as to rotate around a fulcrum from a first position to a second position, the trigger lever having a trigger means which is located at a position separated by a predetermined distance from the fulcrum and at a position which is different from a position at which the trigger lever abuts the inertial mass; an actuating member which is movable from a non-actuating position at which an occupant protection device is not actuated to an actuating position at which the actuating member actuates the occupant protection device; the actuating member having an engaging member, and when the trigger lever is at the first position, the engaging member engages with the trigger means so as to position the actuating member at the non-actuating position, and when the trigger lever is moved to the second position, the engaging member cancels engagement of the trigger means and the engaging member so that the actuating member is movable to the actuating position; and urging means for usually urging the actuating member toward the actuating position.

In accordance with the acceleration sensor having the above-described structure, when the trigger lever is at the first position, the trigger means of the trigger lever and the engaging portion provided at the actuating member are engaged. The actuating member is prevented from moving to the actuating position, and the non-actuating position is maintained. At this time, the urging means urges the trigger lever via the actuating member to the first position. Therefore, a rotation moment, which is based on the distance from the center of rotation of the trigger lever to the point of engagement of the trigger means and the engaging portion, is generated in the trigger lever. Due to this rotation moment, resistance against inertial movement is applied to the inertial mass. The resistance corresponds to the ratio between, on the one hand, the distance from the center of rotation of the trigger lever to the point of abutment of the inertial mass and the trigger lever, and, on the other hand, the distance from the center of rotation of the trigger lever to the point of engagement.

Force applied to the inertial mass due to deceleration, vibration and the like generated under normal running conditions of the vehicle is small, and inertial movement of the inertial mass is prevented by resistance due to the urging force of the urging means. Therefore, the trigger lever does not rotate, engagement of the trigger means and the engaging portion is maintained, and the actuating member does not move inadvertently.

When the vehicle suddenly decelerates, the force applied to the inertial mass is great. The inertial mass moves inertially against the resistance generated by the urging force of the urging means so that the trigger lever rotates from the first position to the second position. At the second position, the engagement of the trigger means of the trigger lever and the engaging portion provided at the actuating member is canceled, and the actuating member is moved from the non-actuating position to the actuating position by the urging force of the urging means. The occupant protecting device can thereby be actuated.

Accordingly, both the moving/urging force necessary to move the actuating member to the actuating position and the resistance against the inertial movement of the inertial mass are provided by a single urging means.

Further, the number of structural parts can be decreased, and consequently, the number of assembly processes can be reduced. These effects are not achieved by conventional acceleration sensors.

DESCRIPTION OF THE PREFERRED EMBODIMENTS

Figure 1:
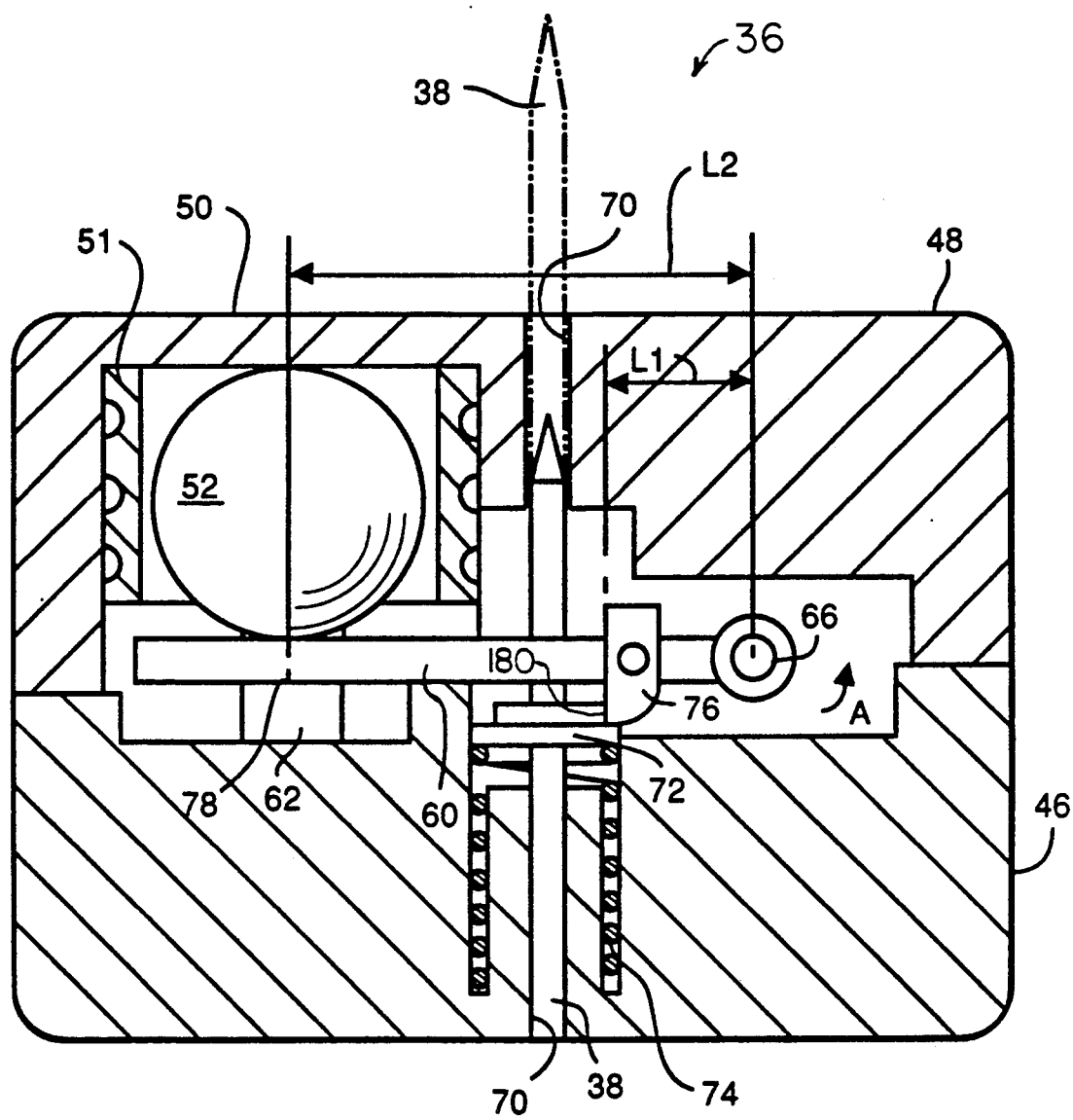
FIG. 1 is a schematic sectional view, taken along a longitudinal direction of a vehicle, of an acceleration sensor relating to a first embodiment of the present invention.

An acceleration sensor relating to the first embodiment of the present invention will be described with reference to FIGS. 1 and 2. In the drawings, the FR arrow denotes the front of the vehicle.

Figure 2:
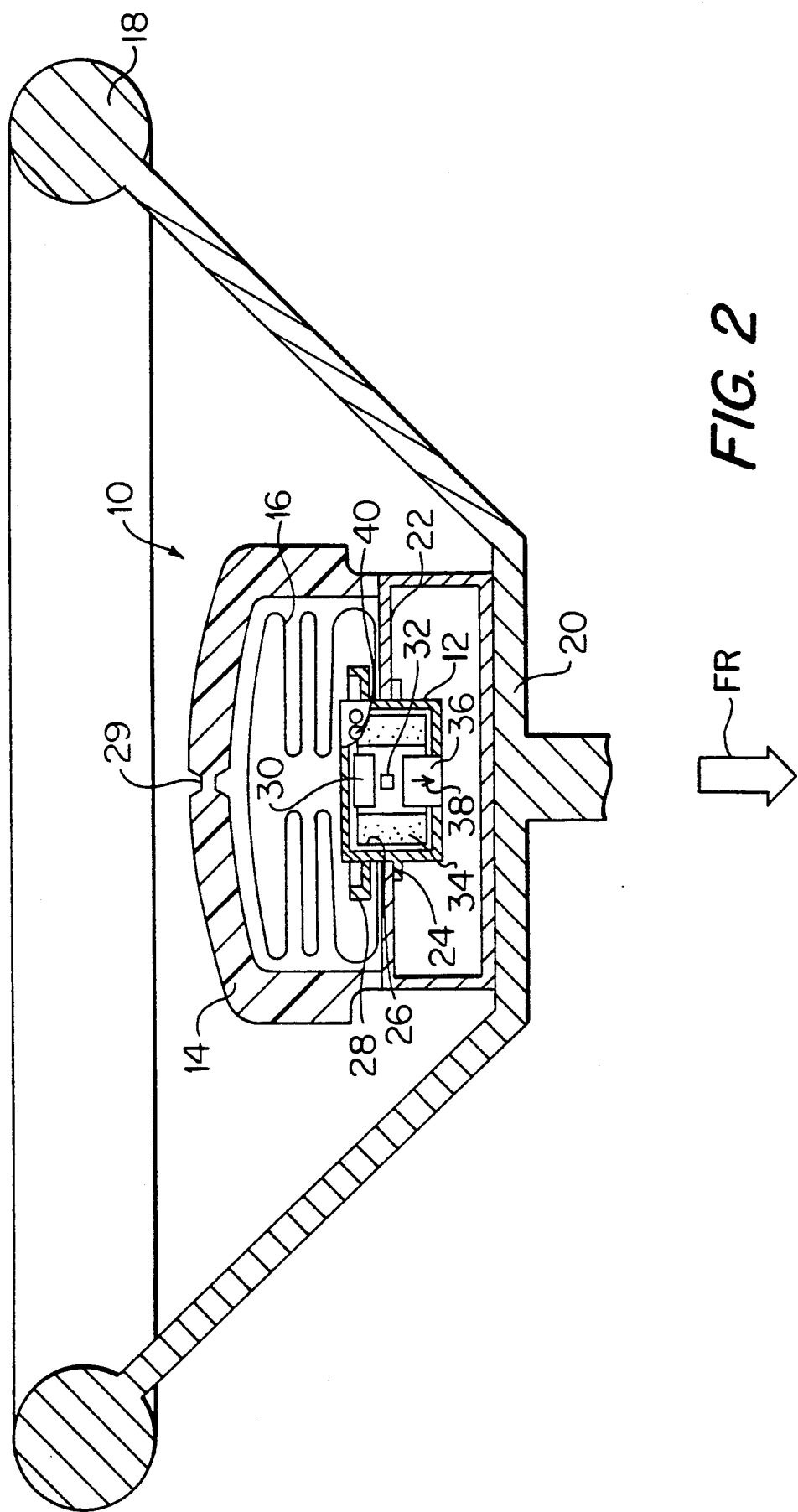
FIG. 2 is a schematic sectional view, taken along the longitudinal direction of the vehicle, of an air bag device to which the acceleration sensor illustrated in FIG. 1 is applied.

In FIG. 2, an air bag device 10 serving as an occupant protection device is illustrated. The air bag device 10 is formed of an inflator 12, a cover 14, and an air bag body 16 (hereinafter referred to as "air bag"). The air bag device 10 is mounted to a base plate 22 which is supported by a hub 20 of a steering wheel 18.

The inflator 12 is cylindrical and is formed coaxially with the axis of rotation of the steering wheel 18. The inflator 12 is fixed to the base plate 22 via a mounting flange 24 such that approximately half of the inflator 12 in the direction of the axis of rotation thereof penetrates the base plate 22 and projects toward the occupant.

The air bag 16 is disposed in a folded-up condition on the side of the base plate 22 toward the occupant. A gas supplying opening 26 is formed at the end portion of the air bag 16 on the side opposite the occupant. The peripheral portion of the gas supplying opening 26 is fixed to the base plate 22 so as to be interposed between a mounting ring 28 and the base plate 22. The portion of the inflator 12 which protrudes toward the occupant can thereby enter into the gas supplying hole 26.

The cover 14 is bowl-shaped and is fixed to the base plate 22 so as to be turned upside-down as seen from the occupant side. The air bag 16 is accommodated in the space enclosed by the base plate 22 and the cover 14. Thin portions 29 are formed at the portion of the cover 14 which opposes the inflator 12 (i.e., the portion of the bottom wall opposing the occupant). When the air bag 16 inflates, the thin portions 29 are broken so that the cover 14 can unfold in a manner resembling the opening of French doors.

As illustrated in FIG. 2, an enhancer 30, a detonator 32, a gas generating material 34 and an acceleration sensor 36 are accommodated in the inflator 12. When the vehicle suddenly decelerates, an ignition pin 38, which constitutes an actuating member of the acceleration sensor 36, collides with the detonator 32 and so as to ignite the detonator 32. Due to this ignition, the gas generating material 34 combusts, and gas is generated. The gas is supplied via a gas hole 40 to the interior of the air bag 16.

The acceleration sensor 36 will now be described in detail.

As illustrated in FIG. 1, a ball 52 serving as an inertial mass is disposed within a housing 50 formed by a front housing 46 and a rear housing 48. The ball 52 is accommodated within a cylinder 51 which is provided in the rear housing 48 along the longitudinal direction of the vehicle. When the vehicle suddenly decelerates in a direction toward the front of the vehicle, the ball 52 can move inertially within the cylinder 51 toward the front of the vehicle.

Further, a trigger lever 60 and the ignition pin 38 are disposed within the housing 50. The trigger lever 60 is formed by a lever 62 and a trigger member 76. The lever 62 extends in a direction substantially orthogonal to the direction of movement of the ball 52. The trigger member 76, which serves as a trigger means, is provided integrally with the lever 62 at a position between a longitudinally central portion of the lever 62 and one longitudinal direction end portion (i.e., the left end portion in the transverse direction of the vehicle and the right end portion as illustrated in FIG. 1) of the lever 62. A supporting shaft 66 is provided so as to project from one end portion of the lever 62. The supporting shaft 66 is axially supported by the walls of the housing 50 in the vertical direction of the vehicle (i.e., both walls in a direction orthogonal to the surface of the paper in FIG. 1). As a result, the lever 62 rotates freely around the supporting shaft 66. The other end portion of the lever 62 (i.e., the right end portion in the transverse direction of the vehicle and the left end portion as illustrated in FIG. 1) abuts the circumferential surface of the ball 52 at the side of the ball 52 in the direction of inertial movement thereof (i.e., the circumferential surface toward the front of the vehicle). When the ball 52 moves inertially toward the front of the vehicle and the end portion of the lever 62 is pushed, the lever 62 rotates around the supporting shaft 66 counterclockwise in FIG. 1 (i.e., in the direction of arrow A).

The ignition pin 38 is disposed such that the longitudinal direction thereof is parallel to the direction of movement of the ball 52. A movement guide path 70 is formed so as to penetrate the housing 50. The ignition pin 38 is movable along the movement guide path 70 from a non-actuating position to an actuating position. At the non-actuating position, the end portion of the ignition pin 38 toward the rear of the vehicle is positioned within the housing (the position illustrated by the solid line in FIG. 1). At the actuating position, the end portion of the ignition pin 38 toward the rear of the vehicle projects outside of the housing 50 and collides with the detonator 34 so that the detonator 34 is ignited and the air bag device 10 is actuated. (The actuating position is illustrated by the imaginary line in FIG. 1). An engaging collar 72, which serves as an engaging portion, is provided at a longitudinally intermediate portion of the ignition pin 38. The engaging collar 72 is formed from a disc-shaped member having a stepped portion formed in an outer peripheral portion thereof. The end surface of the engaging collar 72 toward the front of the vehicle abuts one end of a coil spring 74 serving as an urging means. The coil spring 74 is provided within the housing 50 and urges the ignition pin 38 along the movement guide path 70 toward the rear of the vehicle. Usually, the ignition pin 38 is urged by the coil spring 74 to move in the direction of the actuating position and applies force for ignition to the detonator 34 at the actuating position.

A trigger member 76 is provided at the lever 62 so as to correspond to the engaging collar 72. The trigger member 76 is positioned between a point of abutment 78, at which the ball 52 and the lever 62 abut, and the supporting shaft 66, which is the center of rotation of the lever 62, so as to be separated from the supporting shaft 66 by a predetermined distance. The trigger member 76 can move integrally with the lever 62. Usually, the lever 62 is located at a first position (i.e., the position illustrated by the solid line in FIG. 1). At this first position, the engaging collar 72 and the trigger member 76 are engaged, and the ignition pin 38 is maintained at the non-actuating position. Further, when the lever 62 is at the first position, the engaging collar 72 pushes the trigger member 76 due to the urging force of the coil spring 74. At this time, a rotation moment, which is based on the distance L1 from a point of engagement 180 of the trigger member 76 and the engaging collar 74 to the supporting shaft 66, acts on the lever 62. Due to this rotation moment, the lever 62 is urged to rotate clockwise around the supporting shaft 66. The resistance or the bias force of the lever 62 with respect to the ball 52 corresponds to a ratio of a distance L2, from the point of abutment 78 to the supporting shaft 66, to the distance L1, and is applied to the ball 52.

When the vehicle suddenly decelerates, the ball 52 inertially moves a predetermined amount against the urging force of the coil spring 74. The lever 62 rotates and reaches a second position (i.e., the position illustrated by the imaginary line in FIG. 1). At the second position, the engagement of the trigger member 76 and the engaging collar 72 is canceled, and the ignition pin 38 is permitted to move to the actuating position at which the detonator 34 is actuated.

Next, operation of the above-described first embodiment of the present invention will be described.

Force which is caused by deceleration, vibration and the like generated under normal running conditions of the vehicle and which is applied to the ball 52 is small. Inertial movement of the ball 52 is prevented by resistance resulting from the urging force of the coil spring 74. Accordingly, the lever 62 does not rotate from the first position to the second position, the engagement of the trigger member 76 and the engagement collar 72 is maintained, and the ignition pin 38 does not move inadvertently.

When the vehicle suddenly decelerates, the force applied to the ball 52 is great, and the ball 52 inertially moves against the resistance due to the urging force of the coil spring 74. The lever 62 is thereby rotated from the first position to the second position. At the second position, the engagement of the trigger member 76 and the engaging collar 72 is canceled. Due to the urging force of the coil spring 74, the ignition pin 38 is moved from the non-actuating position to the actuating position. The air bag device 10 can be actuated due to the movement of the ignition pin 38.

As described above, in accordance with the first embodiment, the moving/urging force necessary to move the ignition pin 38 to the actuating position and the resistance against the inertial movement of the ball 52 can both be supplied by the single coil spring 74. As a result, as compared with conventional apparatuses in which a bias spring and an ignition spring are provided separately, the number of parts can be reduced and the number of assembly processes can be decreased in accordance with the first embodiment of the present invention.

Further, in the present embodiment, the point of engagement 180 of the trigger member 76, which forms a part of the trigger lever 60, and the engaging collar 72 of the ignition pin 38 is positioned between the point of abutment 78 and the supporting shaft 66, which is the center of rotation. However, the present invention is not limited to the same. The point of engagement 180 may be positioned at the left side in FIG. 1 of the point of abutment 78. Alternatively, one of the point of engagement 180 and the point of abutment 78 may be positioned to the right of the supporting shaft 66 on an imaginary extension of the trigger lever 60 in the longitudinal direction thereof. It suffices that, when the trigger member 76 and the engaging collar 72 are engaged, a rotation moment acts on the trigger lever 60, and the ball 52 is pushed by the trigger lever 60 due to this rotation moment.

Next, a second embodiment of the present invention will be described with reference to FIGS. 3 and 4. Structural portions which are the same or similar to those in the first embodiment are denoted by the same reference numerals and description thereof will be simplified or omitted.

In the second embodiment, an acceleration sensor 136 is provided in place of the acceleration sensor 36 of the first embodiment. The acceleration sensor 136 is characterized in that a trigger lever 160 is provided instead of the trigger lever 60.

Figure 4:
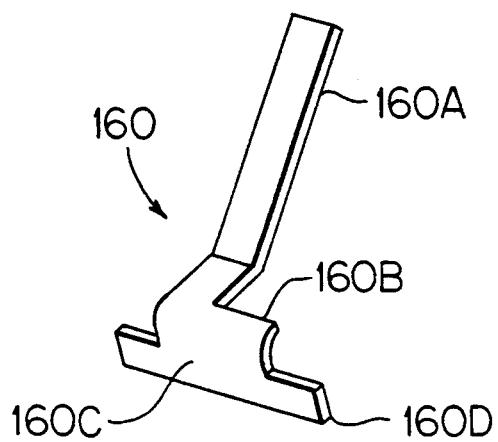
FIG. 4 is a perspective view illustrating a trigger lever shown in FIG. 3.
Figure 6:
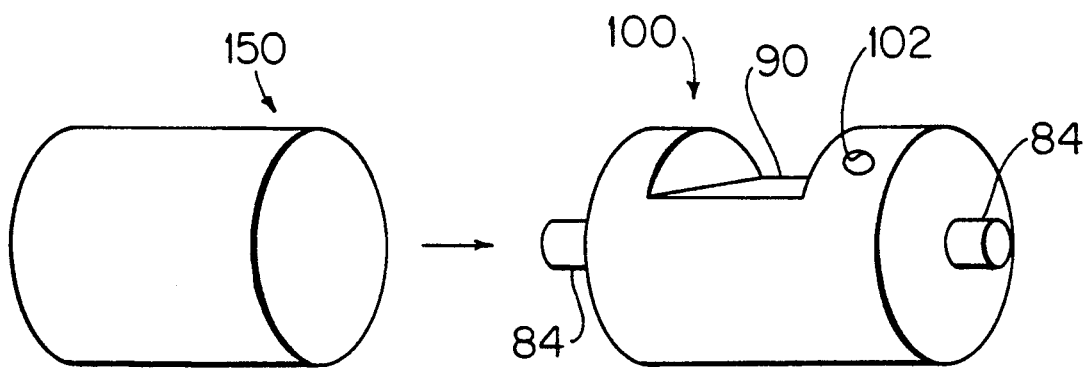
FIG. 6 is a perspective view for explaining a method of processing a trigger member.
Figure 5:
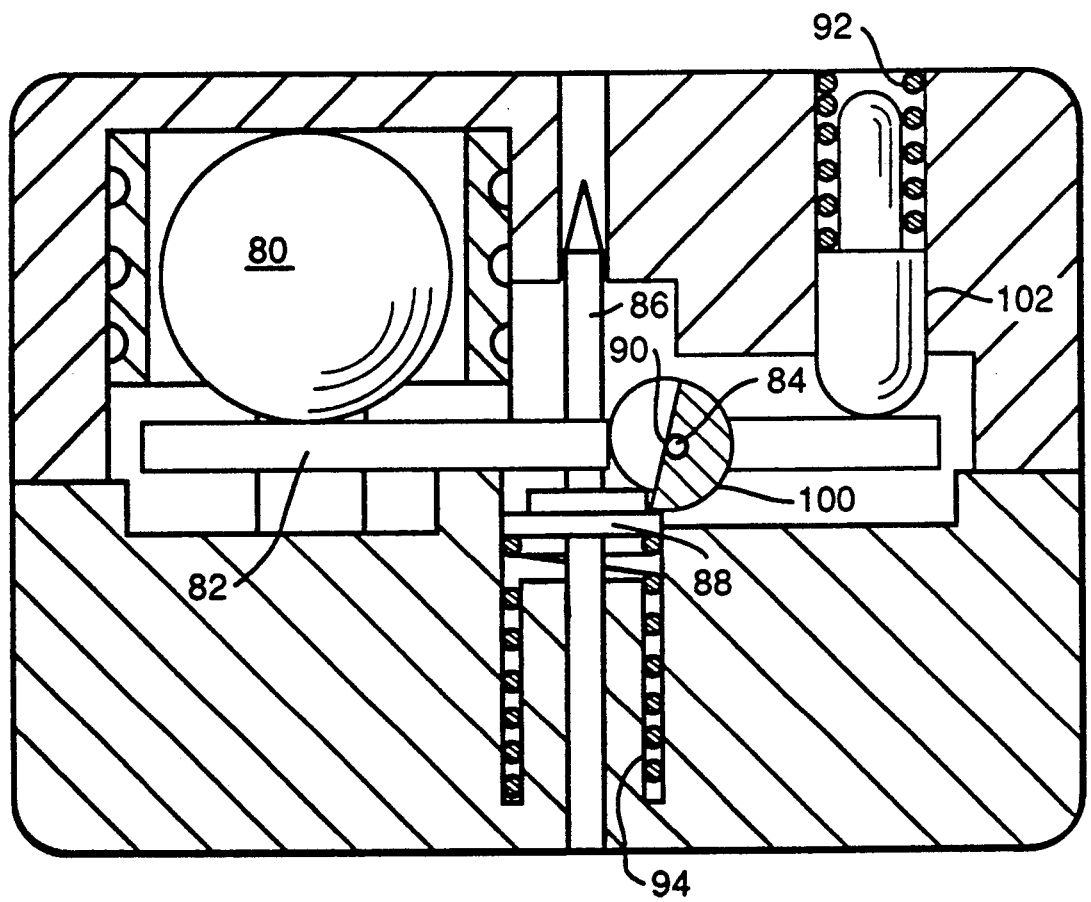
FIG. 5 is a schematic sectional view, taken along a longitudinal direction of a vehicle, of a conventional acceleration sensor.

As illustrated in FIG. 4, the trigger lever 160 is formed by stamping a plate-shaped member into a substantial T-configuration having a lever portion 160A and a base portion. The base portion is formed from one end portion the lever portion 160A, and is formed substantially wider than the lever portion 160A. Next, an intermediate portion of the lever portion 160A is bent so that the base portion protrudes toward the front of the surface of the paper in FIG. 4. A trigger portion 160B which engages with the engaging collar 72 of the ignition pin 38 is formed from this bent portion of the base portion. Finally, the end portion of the base portion is bent at a substantial right angle toward the bottom of FIG. 4.

Figure 3:
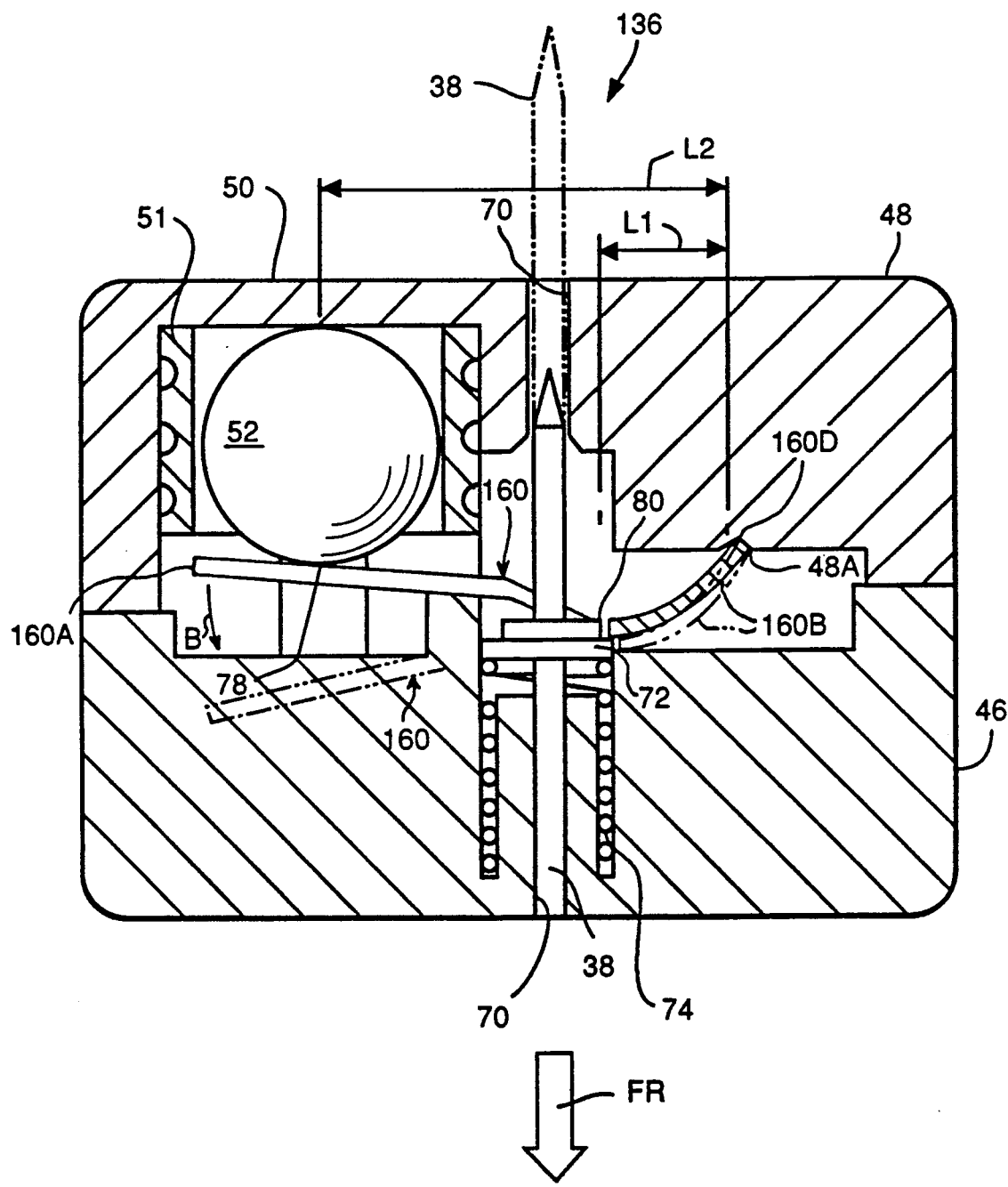
FIG. 3 is a schematic sectional view, taken along a longitudinal direction of a vehicle, of an acceleration sensor relating to a second embodiment of the present invention.

As illustrated in FIG. 3, a triangular groove 48A is formed in the edge surface of the rear housing 48 at the front housing 46 side. An edge 160D of a center of rotation portion 160C of the trigger lever 160 is provided at the center of rotation portion 160C on the side opposite to the lever portion 160A so as extend toward the back of the surface of the paper in FIG. 4. The edge 160D is fit with play into the triangular groove 48A.

The trigger lever 160 is disposed in the acceleration sensor 136 such that the transverse direction of the trigger lever 160 is a direction substantially orthogonal to the direction of movement of the inertial body 52 (i.e., the transverse direction of the trigger lever 160 is the front-to-back direction of the paper in FIG. 3). The edge 160D positioned at one longitudinal direction end of the trigger lever 160 (i.e., the left end portion in the transverse direction of the vehicle and the right end portion in FIG. 3) is fit with play into the triangular groove 48A such that the trigger portion 160B is positioned between a longitudinally central portion of the trigger lever 160 and one end portion of the trigger lever 160. Further, the lever portion 160A which is positioned at the other longitudinal direction end portion of the trigger lever 160 (i.e., the right end portion in the transverse direction of the vehicle and the left end portion in FIG. 3) abuts the circumferential surface of the ball 52 at the side of the ball 52 in the direction of inertial movement thereof (i.e., the surface of the ball 52 toward the front of the vehicle). When the ball 52 moves inertially toward the front of the vehicle and pushes the lever portion 160A of the trigger lever 160, the trigger lever 160 rotates counterclockwise in FIG. 3 (in the direction of arrow B) around the edge portion 160D.

More specifically, the trigger portion 160B is positioned between the point of abutment 78, at which the ball 52 and the trigger lever 160 abut, and the edge 160D, which is the center of rotation of the trigger lever 160, so as to be separated from the edge 160D by a predetermined distance.

Usually, the trigger lever 160 is at a first position (i.e., the position illustrated by the solid line in FIG. 3). At this first position, the engaging collar 72 and the trigger portion 160B are engaged, and the ignition pin 38 is maintained at the non-actuating position at which the detonator 34 is not actuated. Further, when the trigger lever 160 is at the first position, the engaging collar 72 pushes the trigger portion 160B due to the urging force of the coil spring 74. At this time, a rotation moment, which is based on the distance L1 from a point of engagement 180 of the trigger portion 160B and the engaging collar 74 to the edge 160D, acts on the trigger lever 160. Due to this rotation moment, the trigger lever 160 is urged to rotate clockwise around the edge 160D. The resistance or the bias force of the trigger lever 160 with respect to the ball 52 corresponds to a ratio of a distance L2, from the point of abutment 78 to the edge 160D, to the distance L1, and is applied to the ball 52.

When the vehicle suddenly decelerates, the ball 52 inertially moves a predetermined amount from the first position against the resistance resulting from the urging force of the coil spring 74. The trigger portion 160B is urged by the coil spring via the engaging collar 72. Therefore, the trigger lever 160 is stably rotated around the edge 160D, which is pushed against the bottom of the triangular groove 48A, and the trigger lever 160 reaches the second position. At the second position, the engagement of the trigger portion 160B and the engaging collar 72 is canceled, and the ignition pin 38 is permitted to move to the actuating position at which the detonator 34 is actuated.

Other portions of the structure are similar to those of the previously-described first embodiment.

In accordance with the second embodiment having the above-described structure, the operation and effects which are the same as those of the first embodiment are achieved. In addition, the trigger lever 160 is formed integrally by simple processes such as stamping the plate-shaped member, bending, and the like. Therefore, the number of structural parts can be decreased even more, and the processing of the trigger portion is facilitated. Further, for attaching the trigger lever 160 to the housing 50, it suffices to merely form the triangular groove 48A in the rear housing 48. Therefore, there is no need to form a rotation shaft for the trigger lever 160 or to form a shaft receiving portion in the housing 50 to correspond to such a rotation shaft. The number of assembly processes can be further reduced, which leads to a reduction in cost as well.

The present invention is not limited to the above-described first and second embodiments, and a number of variations is possible. For example, in the aforementioned embodiments, the occupant protection device is the air bag device 10. However, the present invention is not limited to the same, and may be applied to, for example, a webbing retractor. In such a case, the present invention may be used to activate a preloader used to tightly apply a webbing to an occupant when the vehicle suddenly decelerates. With the same object in mind, the present invention may also be applied to an inner pretensioner which is a buckle retractor, and may be applied to other devices as well.

What is claimed is:

1. An acceleration sensor comprising:
   an inertial mass disposed to inertially move when a vehicle suddenly decelerates;
   a trigger lever, a longitudinal direction portion of said trigger lever abutting a portion of a peripheral surface of said inertial mass at a side in a direction of inertial movement of said inertial mass, said trigger lever being pushed by said peripheral surface due to inertial movement of said inertial mass so as to rotate around a fulcrum from a first position to a second position, said trigger lever being provided with a trigger means which is located at a position separated by a predetermined distance from said fulcrum and at a position which is different from a position at which said trigger lever abuts said inertial mass;

an actuating member which is movable from a non-actuating position at which an occupant protection device is not actuated to an actuating position at which said actuating member actuates the occupant protection device, said actuating member having an engaging member, and when said trigger lever is at said first position, said engaging member engaging with said trigger means so as to restrain said actuating member at said non-actuating position, and when said trigger lever is moved to said second position, said actuating member being released from engagement of said trigger means to move to said actuating position; and urging means disposed to urge said actuating member at said non-actuating position in a direction of said actuating position, and to urge said trigger lever to apply urging force to said inertial mass in a direction opposite to the direction of inertial movement of said inertial mass for retaining said inertial mass at a non-actuating position during said engagement of said engaging member and said trigger means when said actuating member is at said non-actuating position.

2. An acceleration sensor according to claim 1, wherein said trigger means is formed integrally with said trigger lever.

3. An acceleration sensor according to claim 2, wherein said trigger lever is formed from a single plate-shaped member.

4. An acceleration sensor according to claim 1, wherein said fulcrum is provided at a longitudinal direction end portion of said trigger lever.

5. An acceleration sensor according to claim 1, wherein said trigger lever has a supporting shaft at said fulcrum.

6. An acceleration sensor according to claim 4, wherein said trigger means is provided between said fulcrum and a position at which said trigger lever abuts said inertial mass.

7. An acceleration sensor according to claim 1, wherein said actuating member is provided so as to move substantially parallel to the direction of inertial movement of said inertial mass.

8. An acceleration sensor comprising:
an inertial mass disposed to inertially move when a vehicle suddenly decelerates;
a trigger lever, a longitudinal direction portion of said trigger lever abutting a portion of a peripheral surface of said inertial mass at a side in a direction of inertial movement of said inertial mass, said trigger lever being pushed by said peripheral surface due to inertial movement of said inertial mass so as to rotate around a fulcrum from a first position to a second position, said trigger lever having a supporting shaft which is provided at said fulcrum, and having a trigger means which is provided integrally with said trigger lever at a position separated by a predetermined distance from said fulcrum and at a position which is different from a position at which said trigger lever abuts said inertial mass;
an ignition pin which is movable from a non-actuating position, at which an occupant protection device is not actuated, to an actuating position, at which said ignition pint actuates the occupant protection device, in a direction substantially parallel to the direction of inertial movement of said inertial mass, said ignition pin having an engaging member, and when said trigger lever is at said first position, said engaging member engaging with said trigger means so as to restrain said ignition pin at said non-actuating position, and when said trigger lever is moved to said second position, said actuating member being released from engagement of said trigger means to move to said actuating position; and a spring member disposed to urge said ignition pin at said non-actuating position in a direction of said actuation position, and disposed to urge said trigger lever to apply urging force to said inertial mass in a direction opposite to the direction of inertial movement of said inertial mass for retaining said inertial mass at a non-actuating position during said engagement of said engaging member and said trigger means when said ignition pin is at said non-actuating position.

9. An acceleration sensor according to claim 8, wherein said supporting shaft is provided at a longitudinal direction end portion of said trigger lever.

10. An acceleration sensor according to claim 9, wherein said trigger means is provided between said supporting shaft and a position at which said trigger lever abuts said inertial mass.

11. An acceleration sensor according to claim 8, wherein said engaging member is provided at a longitudinally intermediate portion of said ignition pin, and is a disc-shaped member provided coaxially with said ignition pin.

12. An acceleration sensor according to claim 8, wherein said spring member is a compression coil spring.

13. An acceleration sensor comprising:
an inertial mass disposed to inertially move when a vehicle suddenly decelerates;
a trigger lever, a longitudinal direction portion of said trigger lever abutting a portion of a peripheral surface of said inertial mass at a side in a direction of inertial movement of said inertial mass, said trigger lever being pushed by said peripheral surface due to inertial movement of said inertial mass so as to rotate around a fulcrum from a first position to a second position, said trigger lever being formed from a single plate-shaped member and having a trigger portion which is provided integrally with said trigger lever at a position separated by a predetermined distance from said fulcrum and at a position which is different from a position at which said trigger lever abuts said inertial mass;
an ignition pin which is movable from a non-actuating position, at which an occupant protection device is not actuated, to an actuating position, at which said ignition pin actuates the occupant protection device, in a direction substantially parallel to the direction of inertial movement of said inertial mass, said ignition pin having an engaging member, and when said trigger lever is at said first position, said engaging member engaging with said trigger portion so as to restrain said ignition pin at said non-actuating position, and when said trigger lever is moved to said second position, said actuating member being released from engagement of said trigger portion to move to said actuating position; and
a spring member which disposed to urge said ignition pin at said non-actuating position in a direction of said actuating position, and disposed to urge said trigger lever to apply urging force to said inertial mass in a direction opposite to the direction of inertial movement of said inertial mass for retaining said inertial mass at a non-actuating position during said engagement of said engaging member and said trigger means when said ignition pin is at said non-actuating position.

14. An acceleration sensor according to claim 13, wherein said fulcrum is provided at a longitudinal direction end portion of said trigger lever.

15. An acceleration sensor according to claim 14, wherein said trigger portion is provided between said fulcrum and a position at which said trigger lever abuts said inertial mass.

16. An acceleration sensor according to claim 13, wherein said engaging member is provided at a longitudinally intermediate portion of said ignition pin, and is a disc-shaped member provided coaxially with said ignition pin.

17. An acceleration sensor according to claim 13, wherein said spring member is a compression coil spring.

18. An acceleration sensor according to claim 13, further comprising:

a triangular groove into which said fulcrum is fitted with play such that said trigger lever is rotatable.

19. An acceleration sensor according to claim 13, wherein said plate-shaped member is formed such that a width of said plate-shaped member in a vicinity of said trigger portion and said fulcrum is wider than a width of said plate-shaped member in a vicinity of a position at which said trigger lever and said inertial mass abut.

* * * * *